US010605472B2

United States Patent
Sekar et al.

(10) Patent No.: US 10,605,472 B2
(45) Date of Patent: Mar. 31, 2020

(54) MULTIPLE ADAPTIVE GEO-FENCES FOR A BUILDING

(71) Applicant: Ademco Inc., Golden Valley, MN (US)

(72) Inventors: Parthibarajan Perumal Sekar, Salem (IN); Nellaivadivu Paphanasum, Madurai (IN); Kalaivani Periyanadar, Tirunelveli (IN); Sivakumar Balakrishnan, Madurai (IN)

(73) Assignee: Ademco Inc., Golden Valley, MN (US)

( * ) Notice: Subject to any disclaimer, the term of this patent is extended or adjusted under 35 U.S.C. 154(b) by 322 days.

(21) Appl. No.: 15/048,902

(22) Filed: Feb. 19, 2016

(65) Prior Publication Data

US 2017/0241660 A1  Aug. 24, 2017

(51) Int. Cl.
*H04W 24/00* (2009.01)
*H04L 12/28* (2006.01)
(Continued)

(52) U.S. Cl.
CPC .............. *F24F 11/30* (2018.01); *G05B 15/02* (2013.01); *H04W 4/021* (2013.01); *H04W 4/022* (2013.01); *H04W 4/029* (2018.02); *H04W 4/33* (2018.02); *G05B 2219/2614* (2013.01); *G05B 2219/2642* (2013.01)

(58) Field of Classification Search
CPC .............. H04L 67/125; H04L 12/2818; H04L 12/2829; H04L 67/306; H04W 4/021; H04W 4/027; H04W 4/043; H05B 37/0272; H05B 37/0227
See application file for complete search history.

(56) References Cited

U.S. PATENT DOCUMENTS 5,317,670 A    5/1994  Elia
6,255,988 B1   7/2001  Bischoff
(Continued)

FOREIGN PATENT DOCUMENTS

AU    2015201441 A1   10/2015
CN    101689327       5/2013
(Continued)

OTHER PUBLICATIONS

Scanlon et al., "Mutual Information Based Visual Feature Selection for Lipreading," 8th International Conference on Spoken Language Processing, 5 pages, Oct. 4-8, 2004.
(Continued)

*Primary Examiner* — Brian Turner
(74) *Attorney, Agent, or Firm* — Shumaker & Sieffert, P.A.

(57) ABSTRACT

A building automation system may include a memory for storing a first geofence for a first building component and a second geofence for a second building component. A controller may be operably coupled to the memory and may be configured to cause an adjustment to operation of the first building component in response to a user's mobile device crossing the first geofence and may cause an adjustment to operation of the second building component in response to the user's mobile device crossing the second geofence. The controller may be configured to receive one or more current conditions and to adapt a size of the first geofence and/or a size of the second geofence based on the received one or more current conditions.

16 Claims, 13 Drawing Sheets

(51) Int. Cl.
  *H01L 29/08* (2006.01)
  *H04W 4/02* (2018.01)
  *F24F 11/30* (2018.01)
  *H04W 4/021* (2018.01)
  *H04W 4/029* (2018.01)
  *H04W 4/33* (2018.01)
  *G05B 15/02* (2006.01)

(56) References Cited

U.S. PATENT DOCUMENTS

| | | |
|---|---|---|
| 6,356,282 B2 | 3/2002 | Roytman et al. |
| 6,400,956 B1 | 6/2002 | Richton |
| 6,478,233 B1 | 11/2002 | Shah |
| 6,529,137 B1 | 3/2003 | Roe |
| 6,604,023 B1 | 8/2003 | Brown et al. |
| 6,665,613 B2 | 12/2003 | Duvall |
| 6,909,891 B2 | 6/2005 | Yamashita et al. |
| 6,990,335 B1 | 1/2006 | Shamoon et al. |
| 7,083,109 B2 | 8/2006 | Pouchak |
| 7,127,734 B1 | 10/2006 | Amit |
| 7,130,719 B2 | 10/2006 | Ehlers et al. |
| 7,155,305 B2 | 12/2006 | Hayes et al. |
| D535,573 S | 1/2007 | Barton et al. |
| 7,159,789 B2 | 1/2007 | Schwendinger et al. |
| 7,257,397 B2 | 8/2007 | Shamoon et al. |
| 7,327,250 B2 | 2/2008 | Harvey |
| 7,343,226 B2 | 3/2008 | Ehlers et al. |
| 7,385,500 B2 | 6/2008 | Irwin |
| D580,801 S | 11/2008 | Takach et al. |
| 7,451,017 B2 | 11/2008 | McNally |
| 7,510,126 B2 | 3/2009 | Rossi et al. |
| 7,571,865 B2 | 8/2009 | Nicodem et al. |
| 7,574,208 B2 | 8/2009 | Hanson et al. |
| 7,614,567 B2 | 11/2009 | Chapman et al. |
| 7,636,604 B2 | 12/2009 | Bergman et al. |
| 7,668,532 B2 | 2/2010 | Shamoon et al. |
| 7,768,393 B2 | 8/2010 | Nigam |
| 7,801,646 B2 | 9/2010 | Amundson et al. |
| 7,812,274 B2 | 10/2010 | Dupont et al. |
| 7,839,275 B2 | 11/2010 | Spalink et al. |
| 7,904,608 B2 | 3/2011 | Price |
| 7,908,211 B1 | 3/2011 | Chen et al. |
| 7,949,615 B2 | 5/2011 | Ehlers et al. |
| 7,953,518 B2 | 5/2011 | Kansal et al. |
| 7,973,678 B2 | 7/2011 | Petricoin, Jr. et al. |
| 8,018,329 B2 | 9/2011 | Morgan et al. |
| 8,026,261 B2 | 9/2011 | Tam et al. |
| 8,064,935 B2 | 11/2011 | Shamoon et al. |
| 8,065,342 B1 | 11/2011 | Borg et al. |
| 8,095,340 B2 | 1/2012 | Brown |
| 8,115,656 B2 | 2/2012 | Bevacqua et al. |
| 8,125,332 B2 | 2/2012 | Curran et al. |
| 8,126,685 B2 | 2/2012 | Nasle |
| 8,131,401 B2 | 3/2012 | Nasle |
| 8,135,413 B2 | 3/2012 | Dupray |
| 8,140,279 B2 | 3/2012 | Subbloie |
| 8,150,421 B2 | 4/2012 | Ward et al. |
| 8,180,492 B2 | 5/2012 | Steinberg |
| 8,195,313 B1 | 6/2012 | Fadell et al. |
| 8,205,244 B2 | 6/2012 | Nightingale et al. |
| 8,219,114 B2 | 7/2012 | Larsen |
| 8,229,722 B2 | 7/2012 | Nasle |
| 8,229,772 B2 | 7/2012 | Tran et al. |
| 8,232,877 B2 | 7/2012 | Husain |
| 8,255,090 B2 | 8/2012 | Frader-Thompson et al. |
| 8,269,620 B2 | 9/2012 | Bullemer et al. |
| 8,280,536 B1 | 10/2012 | Fadell et al. |
| 8,280,559 B2 | 10/2012 | Herman et al. |
| 8,301,765 B2 | 10/2012 | Goodman |
| 8,305,935 B2 | 11/2012 | Wang |
| 8,315,717 B2 | 11/2012 | Forbes, Jr. et al. |
| 8,332,055 B2 | 12/2012 | Veillette |
| 8,334,906 B2 | 12/2012 | Lipton et al. |
| 8,350,697 B2 | 1/2013 | Trundle et al. |
| 8,386,082 B2 | 2/2013 | Oswald |
| 8,390,473 B2 | 3/2013 | Kryzanowski et al. |
| 8,406,162 B2 | 3/2013 | Haupt et al. |
| 8,412,381 B2 | 4/2013 | Nikovski et al. |
| 8,412,654 B2 | 4/2013 | Montalvo |
| 8,428,867 B2 | 4/2013 | Ashley, Jr. et al. |
| 8,433,344 B1 | 4/2013 | Virga |
| 8,442,695 B2 | 5/2013 | Imes et al. |
| 8,457,797 B2 | 6/2013 | Imes et al. |
| 8,509,954 B2 | 8/2013 | Imes et al. |
| 8,510,241 B2 | 8/2013 | Seshan |
| 8,510,255 B2 | 8/2013 | Fadell et al. |
| 8,510,421 B2 | 8/2013 | Matsuzaki et al. |
| 8,531,294 B2 | 9/2013 | Slavin et al. |
| 8,554,374 B2 | 10/2013 | Lunacek et al. |
| 8,554,714 B2 | 10/2013 | Raymond et al. |
| 8,556,188 B2 | 10/2013 | Steinberg |
| 8,560,127 B2 | 10/2013 | Leen et al. |
| 8,571,518 B2 | 10/2013 | Imes et al. |
| 8,577,392 B1 | 11/2013 | Pal et al. |
| 8,587,445 B2 | 11/2013 | Rockwell |
| 8,606,374 B2 | 12/2013 | Fadell et al. |
| 8,620,393 B2 | 12/2013 | Bornstein et al. |
| 8,620,841 B1 | 12/2013 | Filson et al. |
| 8,626,344 B2 | 1/2014 | Imes et al. |
| 8,630,741 B1 | 1/2014 | Matsuoka et al. |
| 8,634,796 B2 | 1/2014 | Johnson |
| 8,648,706 B2 | 2/2014 | Ranjun et al. |
| 8,666,558 B2 | 3/2014 | Wang et al. |
| 8,670,783 B2 | 3/2014 | Klein |
| 8,686,841 B2 | 4/2014 | Maceca et al. |
| 8,718,826 B2 | 5/2014 | Ramachandran et al. |
| 8,725,831 B2 | 5/2014 | Barbeau et al. |
| 8,798,804 B2 | 8/2014 | Besore et al. |
| 8,810,454 B2 | 8/2014 | Cosman |
| 8,812,024 B2 | 8/2014 | Obermeyer et al. |
| 8,812,027 B2 | 8/2014 | Obermeyer et al. |
| 8,840,033 B2 | 9/2014 | Steinberg |
| 8,868,254 B2 | 10/2014 | Louboutin |
| 8,874,129 B2 | 10/2014 | Forutanpour et al. |
| 8,886,178 B2 | 11/2014 | Chatterjee |
| 8,890,675 B2 | 11/2014 | Ranjan et al. |
| 8,909,256 B2 | 12/2014 | Fraccaroli |
| 8,918,219 B2 | 12/2014 | Sloo et al. |
| 8,941,489 B2 | 1/2015 | Sheshadri et al. |
| 8,965,401 B2 | 2/2015 | Sheshadri et al. |
| 8,965,406 B2 | 2/2015 | Henderson |
| 9,026,261 B2 | 5/2015 | Bukhin et al. |
| 9,033,255 B2 | 5/2015 | Tessier et al. |
| 9,055,475 B2 | 6/2015 | Lacatus et al. |
| 9,071,453 B2 | 6/2015 | Shoemaker et al. |
| 9,113,298 B2 | 8/2015 | Qiu |
| 9,167,381 B2 | 10/2015 | McDonald et al. |
| 9,168,927 B2 | 10/2015 | Louboutin |
| 9,183,530 B2 | 11/2015 | Schwarz et al. |
| 9,210,545 B2 | 12/2015 | Sabatelli et al. |
| 9,215,560 B1 | 12/2015 | Jernigan |
| 9,219,983 B2 | 12/2015 | Sheshadri et al. |
| 9,247,378 B2 | 1/2016 | Bisson et al. |
| 9,280,559 B1 | 3/2016 | Jones |
| 9,288,620 B2 | 3/2016 | Menendez |
| 9,292,022 B2 | 3/2016 | Ramachandran et al. |
| 9,363,638 B1 | 3/2016 | Jones |
| 9,307,344 B2 | 4/2016 | Rucker et al. |
| 9,311,685 B2 | 4/2016 | Harkey et al. |
| 9,313,320 B2 | 4/2016 | Zeilingold et al. |
| 9,363,636 B2 | 6/2016 | Ganesh et al. |
| 9,363,772 B2 | 6/2016 | Burks |
| 9,396,344 B1 | 7/2016 | Jones |
| 9,414,422 B2 | 8/2016 | Belghoul et al. |
| 9,432,807 B2 | 8/2016 | Kern, Jr. et al. |
| 9,433,681 B2 | 9/2016 | Constien et al. |
| 9,449,491 B2 | 9/2016 | Sager et al. |
| 9,477,239 B2 | 10/2016 | Bergman et al. |
| 9,491,577 B1 | 11/2016 | Jones |
| 9,495,866 B2 | 11/2016 | Roth et al. |
| 9,521,519 B2 | 12/2016 | Chiou et al. |
| 9,552,002 B2 | 1/2017 | Sloo et al. |
| 9,560,482 B1 | 1/2017 | Frenz |
| 9,589,435 B2 | 3/2017 | Finlow-Bates |

(56) References Cited

U.S. PATENT DOCUMENTS

| | | |
|---|---|---|
| 9,594,384 B2 | 3/2017 | Bergman et al. |
| 9,609,478 B2 | 3/2017 | Frenz et al. |
| 9,618,227 B2 | 4/2017 | Drew |
| 9,628,951 B1 | 4/2017 | Kolavennu et al. |
| 9,635,500 B1 | 4/2017 | Becker et al. |
| 9,645,589 B2 | 5/2017 | Leen et al. |
| 9,674,658 B2 | 6/2017 | Partheesh |
| 9,900,174 B2 | 2/2018 | Gamberini |
| 2002/0147006 A1 | 10/2002 | Coon et al. |
| 2004/0034484 A1 | 2/2004 | Solomita, Jr. et al. |
| 2005/0172056 A1 | 8/2005 | Ahn |
| 2006/0063522 A1 | 3/2006 | McFarland |
| 2006/0097063 A1 | 5/2006 | Zeevi |
| 2007/0037605 A1 | 2/2007 | Logan |
| 2007/0043478 A1 | 2/2007 | Ehlers et al. |
| 2007/0060171 A1 | 3/2007 | Sudit et al. |
| 2007/0099626 A1 | 5/2007 | Lawrence et al. |
| 2007/0114295 A1 | 5/2007 | Jenkins |
| 2007/0249319 A1 | 10/2007 | Faulkner et al. |
| 2008/0094230 A1 | 4/2008 | Mock et al. |
| 2008/0143550 A1 | 6/2008 | Ebrom et al. |
| 2008/0262820 A1 | 10/2008 | Nasle |
| 2009/0012704 A1 | 1/2009 | Franco et al. |
| 2009/0187499 A1 | 7/2009 | Mulder et al. |
| 2009/0240381 A1 | 9/2009 | Lane |
| 2009/0302994 A1 | 12/2009 | Rhee et al. |
| 2010/0034386 A1 | 2/2010 | Choong et al. |
| 2010/0042940 A1 | 2/2010 | Monday et al. |
| 2010/0081375 A1 | 4/2010 | Rosenblatt et al. |
| 2010/0127854 A1 | 5/2010 | Helvick et al. |
| 2010/0156628 A1 | 6/2010 | Ainsbury et al. |
| 2010/0261465 A1 | 10/2010 | Rhoads et al. |
| 2011/0153525 A1 | 6/2011 | Benco et al. |
| 2011/0214060 A1 | 9/2011 | Imes et al. |
| 2011/0314144 A1 | 12/2011 | Goodman |
| 2012/0065802 A1 | 3/2012 | Seeber et al. |
| 2012/0172027 A1 | 7/2012 | Partheesh et al. |
| 2012/0185101 A1 | 7/2012 | Leen et al. |
| 2012/0191257 A1 | 7/2012 | Corcoran et al. |
| 2012/0209730 A1 | 8/2012 | Garrett |
| 2012/0259466 A1 | 10/2012 | Ray et al. |
| 2012/0284769 A1 | 11/2012 | Dixon et al. |
| 2013/0073094 A1* | 3/2013 | Knapton ............... F24F 11/0034 700/278 |
| 2013/0204441 A1 | 8/2013 | Sloo et al. |
| 2013/0225196 A1 | 8/2013 | James et al. |
| 2013/0226352 A1 | 8/2013 | Dean-Hendricks et al. |
| 2013/0231137 A1 | 9/2013 | Hugie et al. |
| 2013/0267253 A1 | 10/2013 | Case et al. |
| 2013/0310053 A1 | 11/2013 | Srivastava et al. |
| 2013/0318217 A1 | 11/2013 | Imes et al. |
| 2013/0331087 A1 | 12/2013 | Shoemaker et al. |
| 2013/0331128 A1 | 12/2013 | Qiu |
| 2014/0031989 A1 | 1/2014 | Bergman et al. |
| 2014/0031991 A1 | 1/2014 | Bergman et al. |
| 2014/0045482 A1 | 2/2014 | Bisson et al. |
| 2014/0100835 A1 | 4/2014 | Majumdar et al. |
| 2014/0156087 A1 | 6/2014 | Amundson |
| 2014/0164118 A1 | 6/2014 | Polachi |
| 2014/0172176 A1 | 6/2014 | Deilmann et al. |
| 2014/0200718 A1 | 7/2014 | Tessier |
| 2014/0244048 A1 | 8/2014 | Ramachandran et al. |
| 2014/0248910 A1* | 9/2014 | Dave ..................... H04W 4/021 455/456.3 |
| 2014/0266635 A1 | 9/2014 | Roth et al. |
| 2014/0277762 A1 | 9/2014 | Drew |
| 2014/0302879 A1 | 10/2014 | Kim et al. |
| 2014/0313032 A1 | 10/2014 | Sager et al. |
| 2014/0330435 A1 | 11/2014 | Stoner et al. |
| 2014/0337123 A1 | 11/2014 | Neurenberg et al. |
| 2014/0349672 A1 | 11/2014 | Kern et al. |
| 2014/0370911 A1 | 12/2014 | Gorgenyi et al. |
| 2015/0065161 A1 | 3/2015 | Ganesh et al. |
| 2015/0094860 A1 | 4/2015 | Finnerty et al. |
| 2015/0140994 A1 | 5/2015 | Partheesh et al. |
| 2015/0141045 A1 | 5/2015 | Qiu et al. |
| 2015/0159895 A1 | 6/2015 | Quam et al. |
| 2015/0163631 A1 | 6/2015 | Quam et al. |
| 2015/0163945 A1 | 6/2015 | Barton et al. |
| 2015/0181382 A1 | 6/2015 | McDonald et al. |
| 2015/0186497 A1 | 7/2015 | Patton et al. |
| 2015/0228419 A1 | 8/2015 | Fadell |
| 2015/0237470 A1 | 8/2015 | Mayor et al. |
| 2015/0271638 A1 | 9/2015 | Menayas et al. |
| 2015/0301543 A1* | 10/2015 | Janoso ..................... G05F 1/66 700/291 |
| 2015/0309484 A1 | 10/2015 | Lyman |
| 2015/0338116 A1 | 11/2015 | Furuta et al. |
| 2015/0370272 A1 | 12/2015 | Reddy et al. |
| 2015/0372832 A1 | 12/2015 | Kortz et al. |
| 2016/0007156 A1 | 1/2016 | Chiou et al. |
| 2016/0018122 A1 | 1/2016 | Frank et al. |
| 2016/0018832 A1* | 1/2016 | Frank ..................... F24F 11/006 700/276 |
| 2016/0054865 A1 | 2/2016 | Kerr et al. |
| 2016/0057572 A1 | 2/2016 | Bojorquez et al. |
| 2016/0142872 A1 | 5/2016 | Nicholson et al. |
| 2016/0189496 A1 | 6/2016 | Modi |
| 2016/0223998 A1 | 8/2016 | Songkakul et al. |
| 2016/0261424 A1 | 9/2016 | Gamberini |
| 2016/0286033 A1 | 9/2016 | Frenz et al. |
| 2016/0313749 A1 | 10/2016 | Frenz |
| 2016/0313750 A1 | 10/2016 | Frenz et al. |
| 2017/0026506 A1 | 1/2017 | Haepp et al. |
| 2017/0130979 A1 | 5/2017 | Kolavennu et al. |
| 2017/0134214 A1 | 5/2017 | Sethuraman et al. |
| 2017/0171704 A1 | 6/2017 | Frenz |
| 2017/0181100 A1 | 6/2017 | Kolavennu et al. |

FOREIGN PATENT DOCUMENTS

| | | |
|---|---|---|
| CN | 103175287 A | 6/2013 |
| CN | 104704863 A | 6/2015 |
| CN | 105318499 A | 2/2016 |
| DE | 102013226390 A1 | 6/2015 |
| EP | 1515289 | 3/2005 |
| EP | 2607802 EP | 6/2013 |
| EP | 2675195 A2 | 12/2013 |
| EP | 3001116 A1 | 3/2016 |
| JP | 2011203841 A | 10/2011 |
| JP | 2012109680 A | 6/2012 |
| MX | 2012000906 | 9/2012 |
| WO | 2006055334 A1 | 5/2006 |
| WO | WO 2009/034720 | 3/2009 |
| WO | WO 2009/036764 | 3/2009 |
| WO | WO 2009/067251 | 5/2009 |
| WO | WO 2011/011404 | 1/2011 |
| WO | 2011121299 A1 | 10/2011 |
| WO | WO 2012/000107 | 1/2012 |
| WO | 2012068517 A1 | 5/2012 |
| WO | WO 2013/170791 | 11/2013 |
| WO | WO 2014/016705 | 1/2014 |
| WO | WO 2014/047501 | 3/2014 |
| WO | 2014055939 A1 | 4/2014 |
| WO | WO 2014/144323 | 9/2014 |
| WO | 2014200524 A2 | 12/2014 |
| WO | WO 2014/197320 | 12/2014 |
| WO | 2015047739 A1 | 4/2015 |
| WO | 2015089116 A1 | 6/2015 |
| WO | 2015164400 A1 | 10/2015 |

OTHER PUBLICATIONS

Transportation Research Board of the National Academies, "Commuting in America III, the Third National Report on Commuting Patterns and Trends," 199 pages, 2006.

The Extended European Search Report and Opinion for EP Application No. 16156760.7-1862, dated Jul. 8, 2016.

The Extended European Search Report for EP Application No. 1619416, dated Feb. 2, 2017.

The Extended European Search Report for EP Application No. 16196128.9, dated Mar. 7, 2017.

(56) References Cited

OTHER PUBLICATIONS

Gentec, "Feature Focus, Threat Level Management," 2 pages, 2013.
Allure Energy, "Our Technology," http://www.allure-energy.com/pages/about.jsp 1 page, printed May 30, 2012.
The Extended European Search Report for EP Application No. 16195639.6, dated May 31, 2017.
The International Search Report for PCT Application No. PCT/US2010/042589 dated Nov. 22, 2010.
Mozer, "The Neural Network House: An Environment that Adapts to Its Inhabitants," Department of Computer Science, University of Colorado, 5 pages, downloaded May 29, 2012.
Balaji et al., "Sentinel: Occupancy Based HVAC Actuation Using Existing WiFi Infrastructure Within Commercial Buildints," SenSys '13, 14 pages, Nov. 11-15, 2015.
"Petition for Inter Partes Review of U.S. Pat. No. 8,571,518 Pursuant to 35 U.S.C. 311-319, 37 CFR 42," Inventor lmes et al., dated Oct. 29, 2014.
U.S. Appl. No. 14/640,984, filed Mar. 6, 2015.
U.S. Appl. No. 14/668,800, filed Mar. 25, 2015.
U.S. Appl. No. 14/696,662, filed Apr. 27, 2015.
U.S. Appl. No. 14/696,725, filed Apr. 27, 2015.
U.S. Appl. No. 14/933,948, filed Nov. 5, 2015.
U.S. Appl. No. 14/934,543, filed Nov. 6, 2015.
U.S. Appl. No. 14/938,595, filed Nov. 11, 2015.
U.S. Appl. No. 14/938,642, filed Nov. 11, 2015.
U.S. Appl. No. 14/964,264, filed Dec. 9, 2015.
U.S. Appl. No. 14/964,349, filed Dec. 9, 2015.
Do, "Programmable Communicating Thermostats for Demand Response in California," DR ETD Workshop, 26 pages, Jun. 11, 2007.
Green, "PM's Thermostat Guide," Popular Mechanics, pp. 155-158, Oct. 1985.
Gupta et al., "Adding GPS-Control to Traditional Thermostats: An Exploration of Potential Energy Savings and Design Challenges," Pervasive, LNCS 5538, pp. 95-114, 2009.
Gupta, "A Persuasive Gps-Controlled Thermostat System," 89 pages, Sep. 2008.
http://community.lockitron.com/notifications-geofencing-scheduling-sense-bluetooth/633, "Lockitron Community, Notifications, Geofencing, Scheduling, Sense/Bluetooth," 14 pages, printed Oct. 29, 2014.
http://stackoverflow.com/questions/14232712/tracking-multiple-20-locations-with-ios-geofencing, "Tracking Multiple (20+) Locations with iOS Geofencing—Stack Overflow," 2 pages, printed Oct. 29, 2014.
http://www.allure-energy.com/aenf_jan9_12.html, "CES Gets First Look at EverSense," Allure Energy, 2 pages, printed Feb. 17, 2015.
http:/IWww.prnev.tswire.com/nev.ts-releases/allure-energy-unveils-a-combination-of-ibeacon-and-nfc-enabled-smart-sensor-technology-known-as-aura-23885 . . . , "Allure Energy Unveils a Combination of iBeacon and NFC Enabled Smart Sensor Technology Known as Aura," 6 pages, Jan. 6, 2014.
Mobile Integrated Solutions, LLC, "MobiLinc Take Control of Your Home, MobiLinc and Geo-Fence Awareness," 9 pages, downloaded Mar. 27, 2015.
Pan et al., "A Framework for Smart Location-Based Automated Energy Controls in a Green Building Testbed," 6 pages, downloaded Jan. 30, 2015.
SmartThings Inc., "2 Ecobee Si Thermostat + Geofencing," 17 pages, downloaded Nov. 3, 2014.

\* cited by examiner

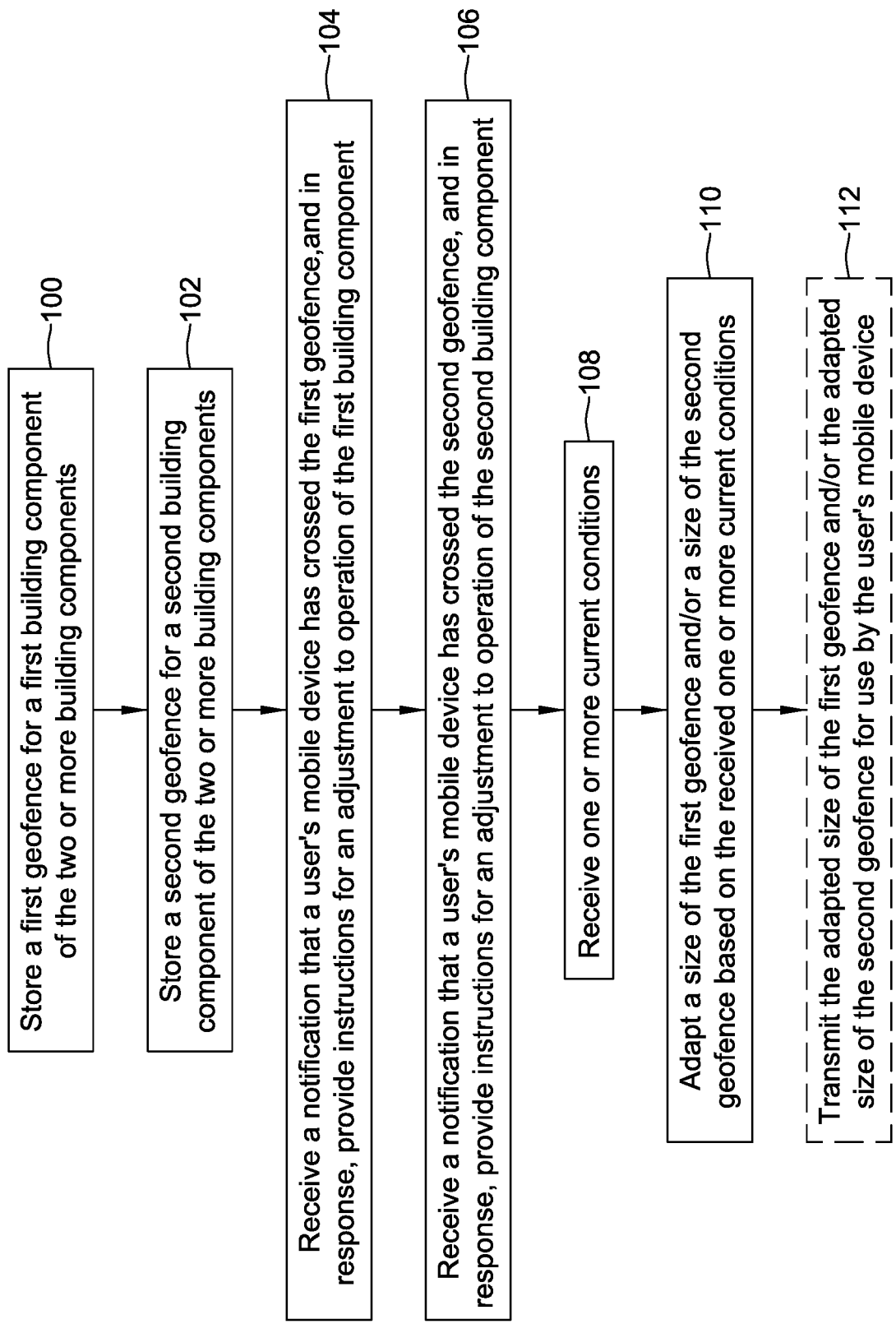

MULTIPLE ADAPTIVE GEO-FENCES FOR A BUILDING

TECHNICAL FIELD

The disclosure relates generally to building automation, and more particularly to building automation systems with geo-fencing capabilities.

BACKGROUND

Building automation systems are often used to control safety, security and/or comfort levels within a building or other structure. Illustrative but non-limiting examples of building automation systems include Heating, Ventilation and/or Air Conditioning (HVAC) systems, security systems, lighting systems, fire suppression systems and/or the like. In some cases, a building automation system may enter an unoccupied mode when the building is expected to be unoccupied and an occupied mode when the building is expected to be occupied. For example, when the building automation system includes an HVAC system, the building automation system may set a temperature set point of the HVAC system to a more energy efficient setting when in an unoccupied mode and a more comfortable setting when in an occupied mode. In another example, when the building automation system includes a security system, the building automation system may set the security system to a locked or away state when in an unoccupied mode and an unlocked or home state when in an occupied mode. Geo-fencing may be used to inform the building automation system as to whether the building is occupied or not occupied.

SUMMARY

The present disclosure relates generally to building automation, and more particularly to building automation systems with geo-fencing capabilities. An example of the disclosure may be found in a building automation system that services a building and controls two or more building components within the building. The example building automation system may include a memory for storing a first geofence for a first building component and a second geofence for a second building component, wherein the second geofence may be different from the first geofence. A controller may be operably coupled to the memory and may be configured to cause an adjustment to operation of the first building component in response to a user's mobile device crossing the first geofence, and may cause an adjustment to operation of the second building component in response to the user's mobile device crossing the second geofence. The controller may be configured to receive one or more current conditions, and to adapt a size of the first geofence and/or a size of the second geofence based on the received one or more current conditions. In some cases, the size of the first geofence is adapted more than the size of the second geofence in response to at least one of the received current conditions.

Illustrative but non-limiting examples of current conditions that may cause the controller to adapt the size of the first geofence and/or the second geofence include a current indoor temperature in the building, a current outdoor temperature, a current indoor humidity in the building, a current outdoor humidity, a current solar load on the building, and a current utility rate. Additional examples include but are not limited to a current traffic condition along a route between the user's mobile device and the building, a current speed of the user's mobile device, a current location of the user's mobile device, and an estimated time of arrival of the user's mobile device at the building.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which:

FIG. 13 is a flow diagram of an illustrative method that may be carried out by a building automation system such as those described herein.

Figure 1:
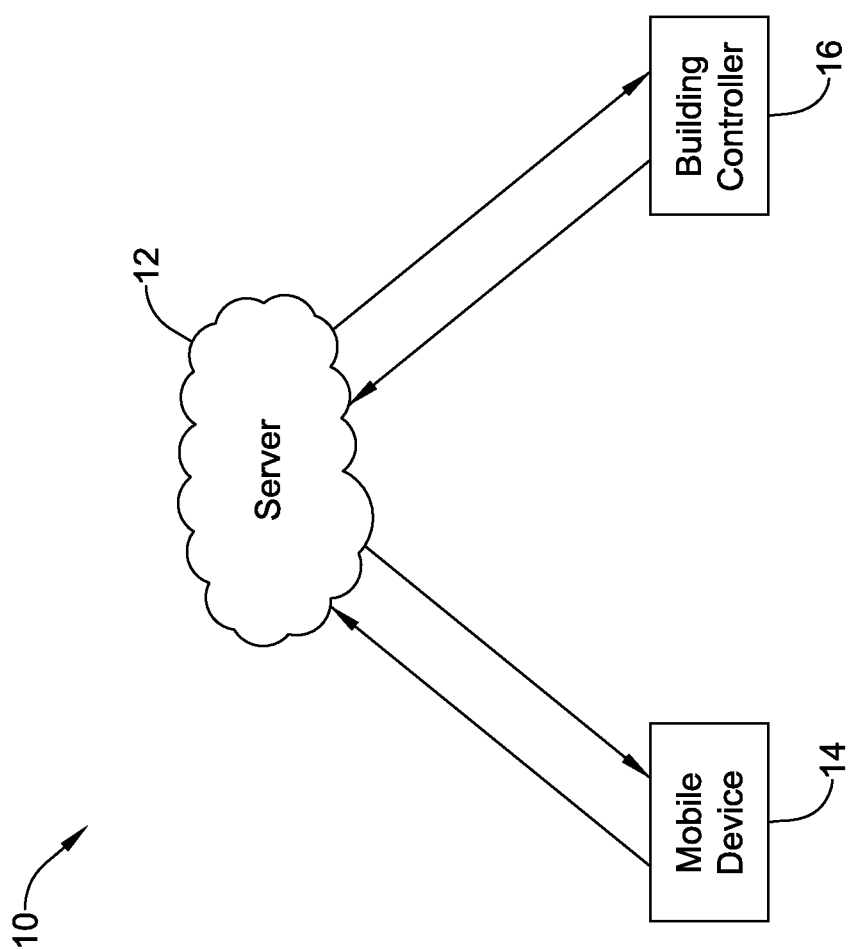
FIG. 1 is a schematic view of an illustrative building automation system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and/or any other suitable systems. While HVAC systems are used as an example below, it should be recognized that the concepts disclosed herein can be applied to building control systems more generally.

A building automation system may include a controller, computer and/or other processing equipment that is configured to control one or more features, functions, systems or sub-systems of a building. In some cases, devices (e.g. mobile devices) can be used by individuals to communicate with the controller, computer and/or other processing equipment. In some cases, a building automation system may include a plurality of components that, in combination, perform or otherwise provide the functionality of the building automation system. The architecture of the building automation system may be centralized or distributed, depending on the application. For example, in some cases, a building automation system may be fully contained within a single building, or may include components that are spread between multiple housings and/or across multiple locations. In some embodiments, a building automation system, regardless of the physical location(s) of the components within the building automation system, may control one or more building systems within a single building. In some cases, a building automation system, regardless of the physical location(s) of the components within the building automation system, may control one or more building systems within a plurality of buildings, optionally in accordance with a common operating procedure and/or distinct operating procedures for each building as desired.

FIG. 1 is a schematic view of an illustrative building automation system 10. The illustrative building automation system 10 includes a server 12 that may be configured to communicate with a mobile device 14 and with a building controller 16. It will be appreciated that for simplicity, only a single mobile device 14 is shown, while in many cases the server 12 may be configured to communicate directly or indirectly with any number of mobile devices 14. Similarly, while a single building controller 16 is illustrated, in many cases the server 12 may be configured to communicate directly or indirectly with any number of building controllers 16, located in a single building or distributed throughout a plurality of buildings. The server 12 is illustrated as a single, cloud-based server. In some cases, the server 12 may be a single server. In some instances, the server 12 may generically represent two, three or more servers commonly located or spread between two or more physical locations. In some cases, the server 12 handles communication with both the mobile device 14 and the building controller 16. In some instances, as shown for example in FIG. 2, distinct servers may carry out each communications protocol if desired.

In some cases, the mobile devices 14 may communicate with the server 12 at least partially through a network such as the Internet, sometimes using a cell phone network, WiFi network and/or any other suitable network. Likewise, it is contemplated that the building controller 16 may communicate with the server 12 at least partially through a network such as the Internet, sometimes using a cell phone network, WiFi network and/or any other suitable network.

Figure 2:
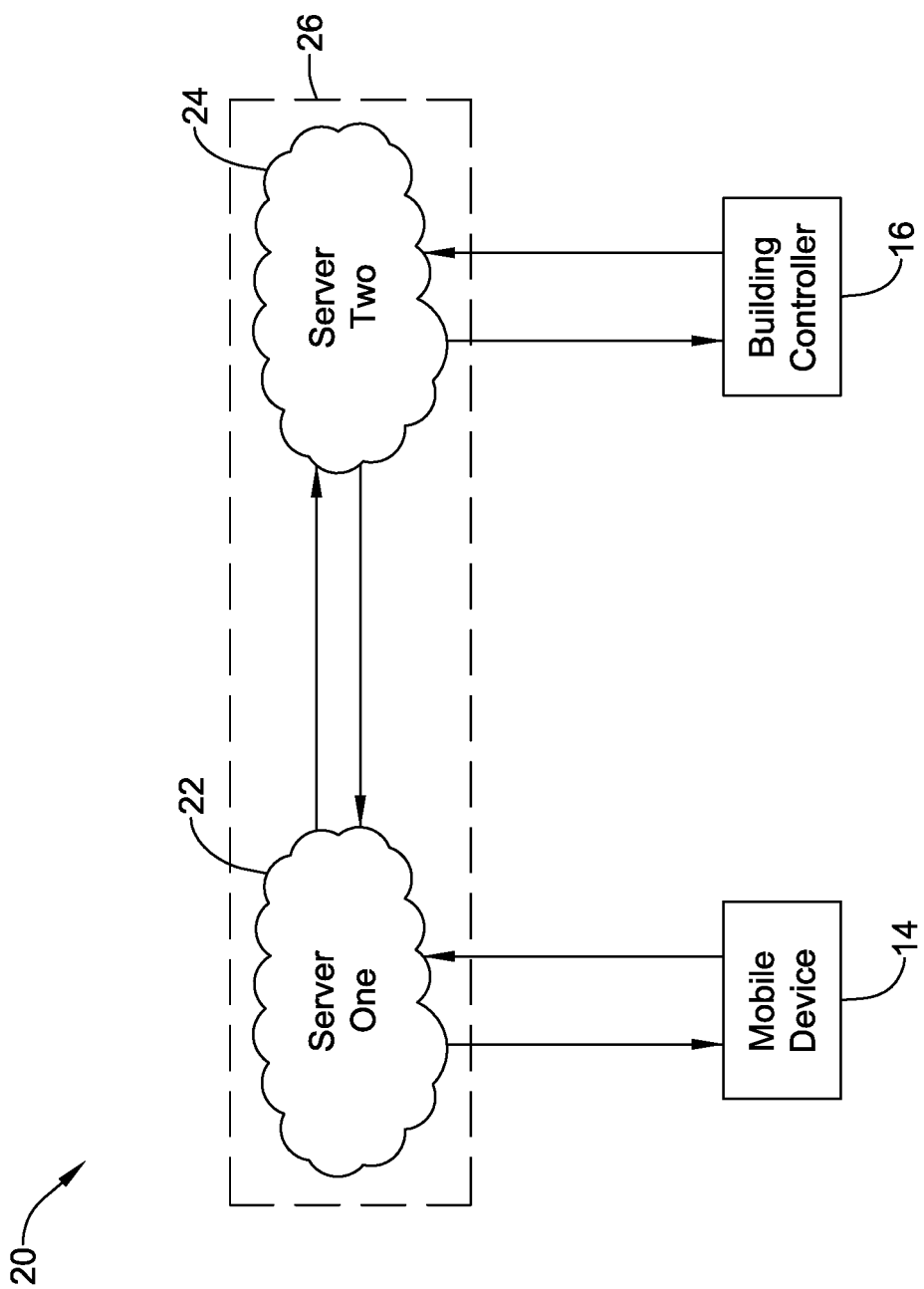
FIG. 2 is a schematic view of another illustrative building automation system.

FIG. 2 is a schematic illustration of another illustrative building automation system 20. The illustrative building automation system 20 includes a first server 22 that may be configured to communicate with a mobile device 14 (or multiple mobile devices 14) and a second server 24 that may be configured to communicate with a building controller 16 (or multiple building controllers 16). The first server 22 may be configured to receive data from the mobile device 14, process the data, and send data to the mobile device 14 and/or to the second server 24. The second server 24 may be configured to receive data from the building controller 16, process the data, and send data to the building controller 16 and/or to the first server 22. In some instances, the first server 22 may be configured to permit data from the mobile device 14 to pass directly through to the building controller 16. In some cases, the second server 24 may be configured to permit data from the building controller 16 to pass directly through to the mobile device 14. The first server 22 and the second server 24 may be configured to communicate with each other. In some cases, each of the first server 22 and the second server 24 may perform a defined function.

It will be appreciated that for simplicity, only a single mobile device 14 is shown, while in many cases the first server 22 may be configured to communicate directly or indirectly with any number of mobile devices 14. Similarly, while a single building controller 16 is illustrated, in many cases the second server 24 may be configured to communicate directly or indirectly with any number of building controllers 16, located in a single building or distributed throughout a plurality of buildings.

The first server 22 is illustrated as a single, cloud-based server. In some cases, the first server 22 may be a single server. In some instances, the first server 22 may generically represent two, three or more servers commonly located or spread between two or more physical locations. The second server 24 is illustrated as a single, cloud-based server. In some cases, the second server 24 may be a single server. In some instances, the second server 24 may generically represent two, three or more servers commonly located or spread between two or more physical locations. In some cases, the first server 22 and the second server 24 may, in combination, be considered as representing or forming a building automation server 26.

Figure 3:
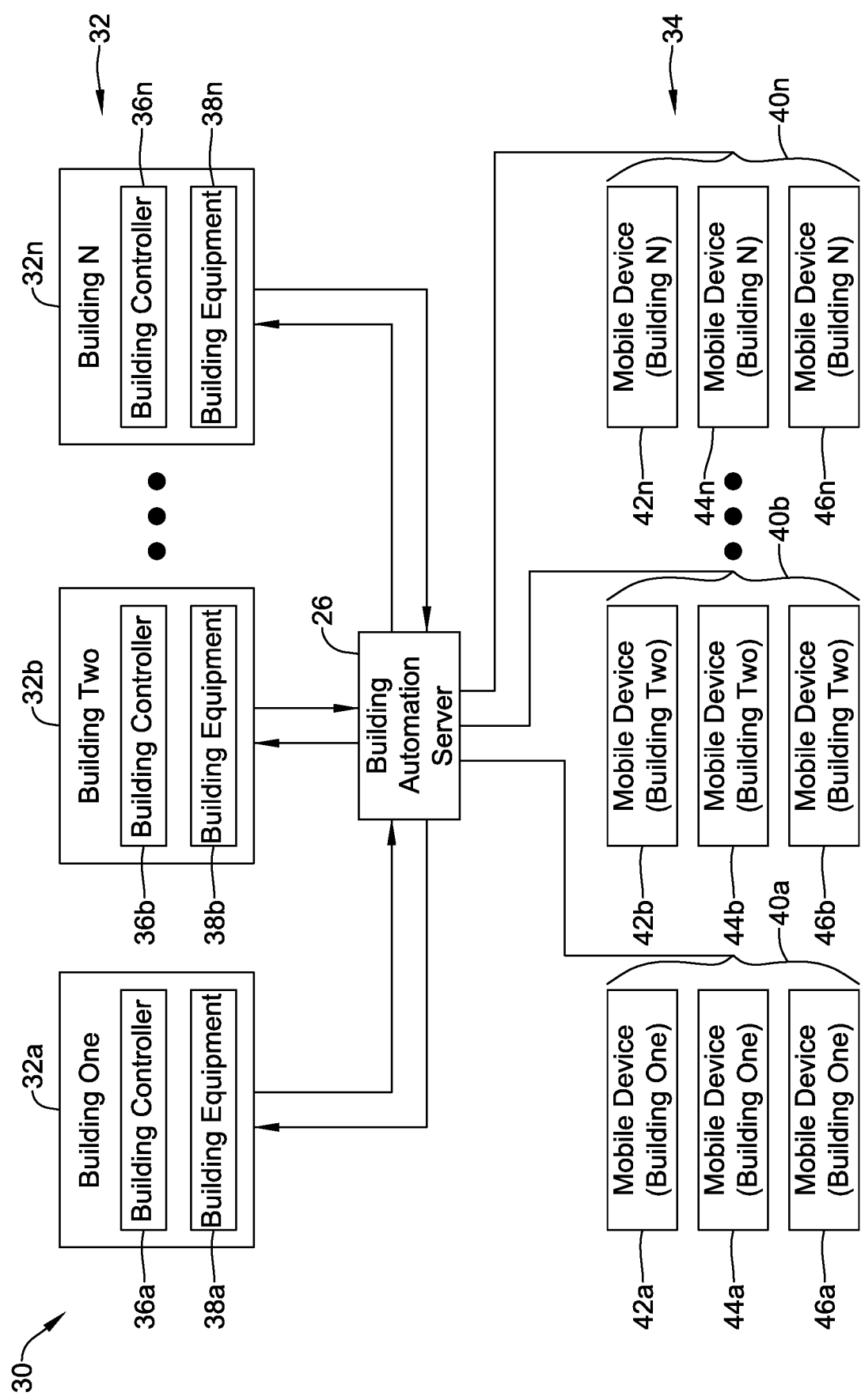
FIG. 3 is a schematic view of another illustrative building automation system.

FIG. 3 is a schematic illustration of a building automation system 30 in which a building automation server 26 is configured to communicate with a plurality of buildings 32 as well as a plurality of mobile devices 34. It is contemplated that the building automation server 26 may include a single server or two or more distinct servers at one or several locations. The building automation system 30 may serve any desired number of buildings. As illustrated, the plurality of buildings 32 includes a Building One, labeled as 32A, a Building Two, labeled as 32B, and so on through a Building "N", labeled as 32N. It will be appreciated that the building automation system 30 may include a large number of buildings, each in communication with a central (or distributed) building automation server 26. In some cases, each building may be associated with a unique customer account, as further described below.

As illustrated, each of the plurality of buildings 32 includes a building controller and one or more pieces of building equipment. The building equipment may, for example, be HVAC equipment, security equipment, lighting equipment, fire suppression equipment, and/or the like. In particular, the building 32A includes a building controller 36A and building equipment 38A, the building 32B includes a building controller 36B and building equipment 38B, and so on through the building 32N, which includes a building controller 36N and building equipment 38N. It will be appreciated that while each building is illustrated as having a single building controller and single building equipment controlled by the single building controller, in some cases a building may have multiple related or unrelated building controllers and/or multiple pieces of related or unrelated building equipment.

The plurality of mobile devices 34 may be considered as being divided into a set of mobile devices each associated with a corresponding building. In the example shown, the plurality of mobile devices 34 may be considered as being divided into a set of mobile devices 40A that are associated with the building 32A, a set of mobile devices 40B that are associated with the building 32B, and so on through a set of mobile devices 40N that are associated with the building 32N. As illustrated, the set of mobile devices 40A includes a first mobile device 42A, a second mobile device 44A and a third mobile device 46A. The set of mobile devices 40B includes a first mobile device 42B, a second mobile device 44B and a third mobile device 46B and so on through the set of mobile devices 40N, which includes a first mobile device 42N, a second mobile device 44N and a third mobile device 46N. This is merely illustrative, as any number of mobile devices such as smartphones or tablets, may be associated with a particular building, as desired. Each user or occupant of a building may have an associated mobile device, or may have several associated mobile devices. In some cases, a user or occupant may have a mobile device associated with several different locations such as a home, a cabin or a place of work.

Associating a mobile device with a particular building generally involves the individual who uses the particular mobile device. In the example shown in FIG. 3, a mobile device can communicate with the building automation server 26, and may cause the building automation server 26 to provide instructions to the building controller that is associated with the particular mobile device. For example, and in some instances, a mobile phone with location services activated can be used to inform the building automation server 26 as to the whereabouts of the user relative to a geofence defined for the associated building, and in some cases an estimate of how long before the user will arrive at the associated building. The building automation server 26 may send a command to the building controller of the associated building to operate the building equipment in an energy savings manner when all of the users that are associated with a particular building are determined to be away from the building (e.g. the building is unoccupied). The building automation server 26 may send a command to the building controller of the associated building to operate the building equipment in a comfort mode when all of the users that are associated with a particular building are determined or deemed not to be away from the building (e.g. the building is occupied).

Figure 4:
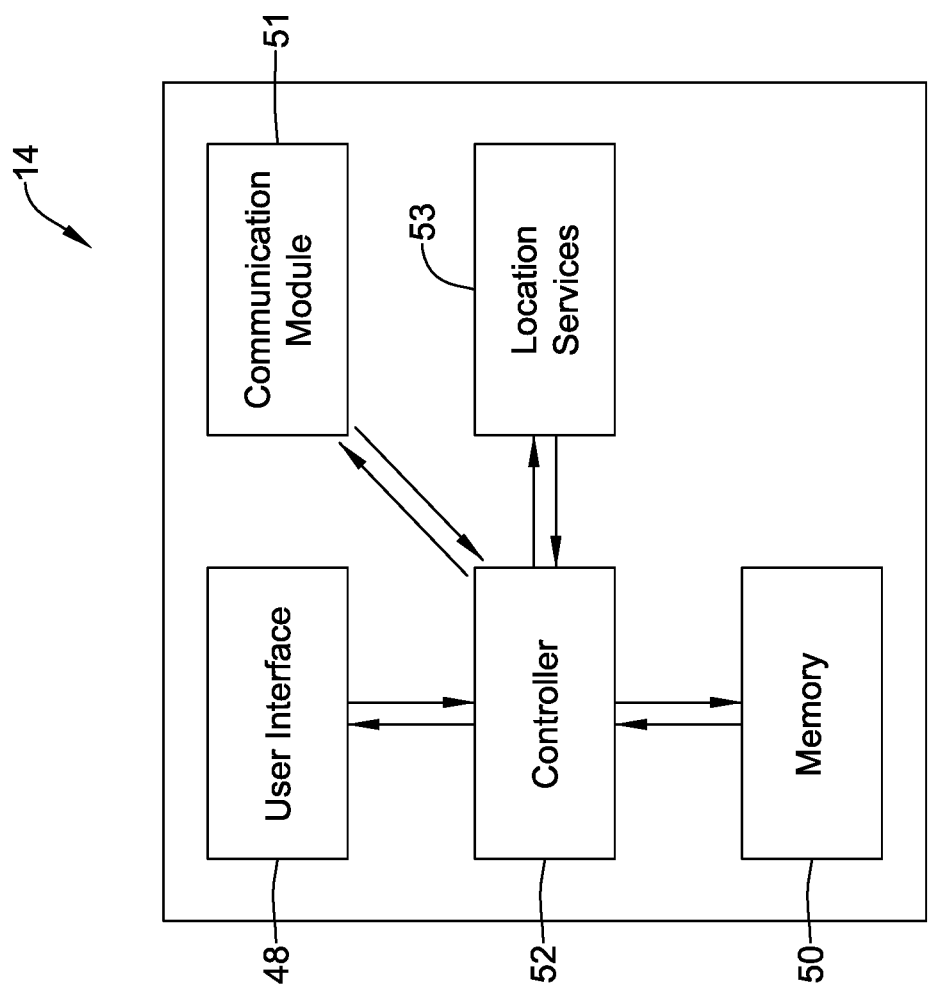
FIG. 4 is a schematic view of an illustrative mobile device.

FIG. 4 is a schematic diagram of the illustrative mobile device 14, as previously referenced in FIGS. 1 and 2. The illustrative mobile device 14 has location services 53 for determining a location of the mobile device 14, and includes a user interface 48, a memory 50, a communications module 51, and a controller 52. In the example shown, the controller 52 may be operably coupled to the user interface 48, the memory 50, location services 53 and the communications module 51. In some cases, the memory 50 may be configured to store an executable program and information pertaining to a geofence assigned to a building. In some cases, the controller 52 may be configured to determine the location of the mobile device 14 via the location services 53 and to determine when a geofence crossing event has occurred. In some cases, the mobile device 14 may be configured to store the geofence associated with the building and to identify when the mobile device 14 crosses the geofence. The controller may communicate the detected geofence crossing events to a building automation server 26 via the communications module 51.

Figure 5:
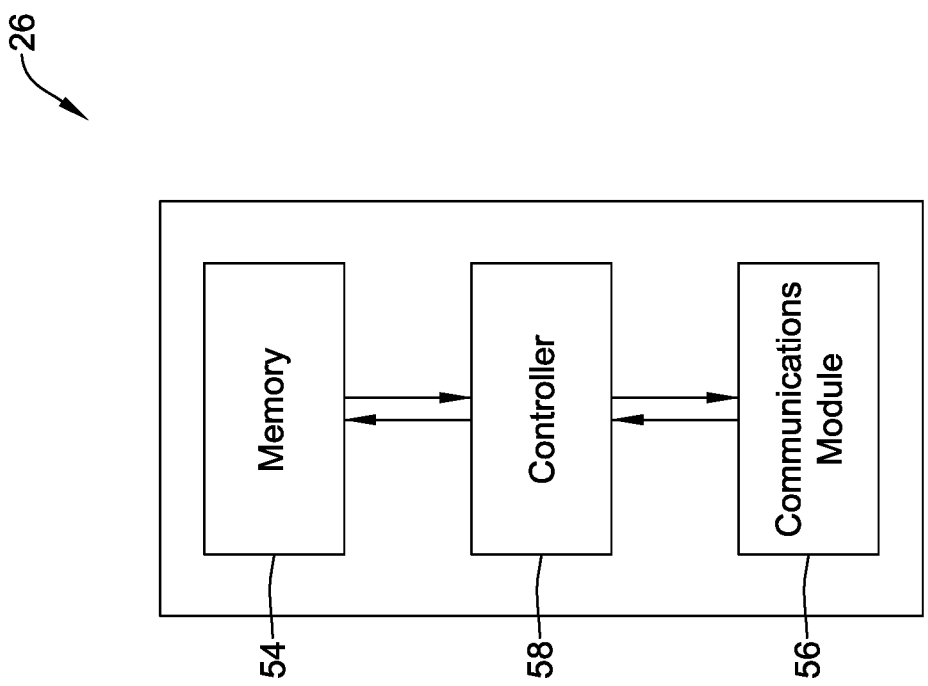
FIG. 5 is a schematic view of an illustrative building automation server.

FIG. 5 is a schematic view of an illustrative building automation server 26, as previously referenced in FIGS. 2 and 3. The building automation server 26 may be configured for servicing a user's building and, in some cases, other buildings as well. The building automation server 26 may include a memory 54, a communications module 56 and a controller 58 that is operably coupled to the memory 54 and to the communications module 56. The memory 54 may be configured for storing a geofence that defines a region about the user's building. The memory may be RAM memory, optical storage, hard disk storage, and/or any other suitable memory. In some cases, the communications module 56 is configured to receive geofence crossing events from one or more mobile devices, such as mobile device 14 of FIG. 4. The communications module 56 may also communicate with one or more building controllers, such as one or more of the building controller 36a, 36b through 36n as shown in FIG. 3. The building controller(s) may control one or more building systems (e.g. HVAC system, security system, lighting system) based at least in part on information corresponding to the detected geofence crossing events. In some instances, a building may include a variety of different building systems, including multiple building systems that may benefit from geofencing.

Figure 6:
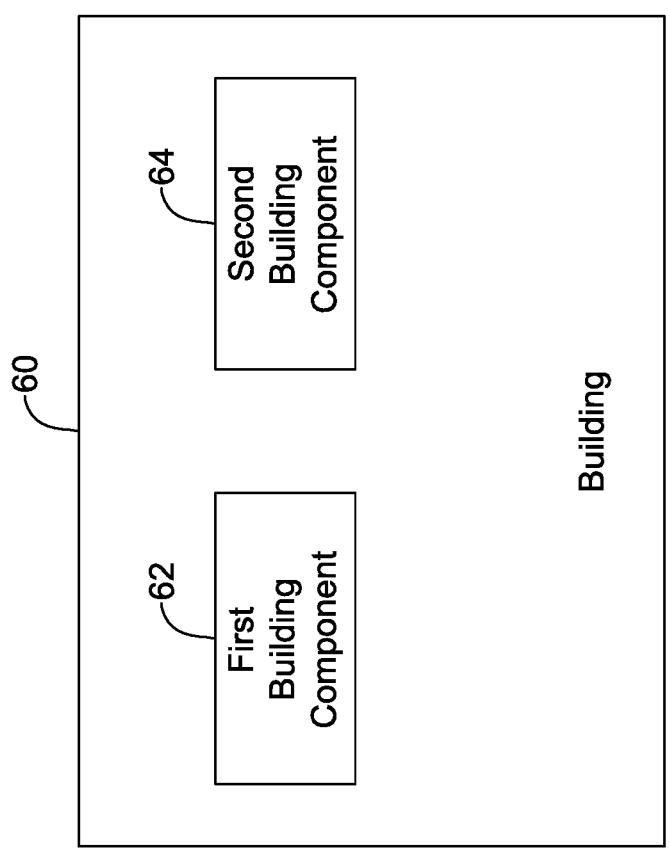
FIG. 6 is a schematic view of an illustrative building that may utilize one of the building automation systems described herein.

FIG. 6 is a schematic view of an illustrative building 60. The building 60 may, for example, be a residence such as house, a townhouse, a condominium or an apartment. In some cases, the building 60 may be an office space or a retail space. In some instances, the building 60 may be considered as being an example of one of the plurality of buildings 32 (FIG. 3), such as the Building One (labeled 32A), the Building Two (32B), and so on through the Building "N" (labeled 32N). The illustrative building 60 includes a First Building Component (labeled as 62) and a Second Building Component (labeled as 64). It will be appreciated that two building components 62, 64 are shown for simplicity, but it is contemplated that the building 60 may include any number of building components. The First Building Component 62 and the Second Building Component 64 may independently represent any number of different building components, equipment and systems. For example, the First Building Component 62 may be an HVAC system or part of an HVAC system for the building 60. In some cases, the Second Building Component 64 may include or otherwise represent one or more of a security system, a lighting system, a cooking appliance, a washing machine, a dryer, a garage door, a pool heater, a motorized window blind, a garage heater, a water heater, a television, and a personal computer.

Geofencing may be utilized in controlling at least some features or functions of the First Building Component 62 and/or the Second Building Component 64 in order to provide a person with the desired functionality of the building component while conserving energy. For example, in operating an HVAC system, considerable energy savings may be achieved by allowing a building temperature to drift from a comfort temperature set point during periods of time in which geofencing indicates that the building 60 is not occupied. Geofencing enables the HVAC system to obtain advance notice of when the building 60 may become occupied, and the HVAC system may determine when to start heating or cooling in order to approach or reach a comfort temperature set point by the time that the building 60 is expected to become occupied.

In some instances, there may be a desire to turn particular systems on or off just before building occupancy is expected. For example, a homeowner may want their home security system to turn off just as they arrive home. As a result, the home is protected up until the homeowner arrives home, but the homeowner does not have to go through the process of disarming their home security system. As another example, a homeowner may want at least portions of their home lighting system to turn on just before they arrive home. In some cases, this may provide the homeowner with the benefit of not coming home to a dark, unlit home yet they are able to conserve energy by not lighting an empty house. In some cases, a homeowner may want to have certain parts of their home lighting system to be in operation when the home is empty, for security purposes, and may want other portions of their home lighting system to turn on as they arrive home.

In some cases, a homeowner may perhaps desire to have a cooking appliance, such as their oven, preheated so that they can pop dinner in the oven as soon as they arrive home without having to wait for the oven to reach a desired temperature while conserving energy by not simply running the oven all day. In some instances, a homeowner may wish to come home and have their pool or hot tub at a particular temperature so that they can take a quick swim when they arrive home. In some cases, a homeowner may wish to come home and find their motorized window blinds opened. Other examples include but are not limited to coming home and having the hot water heater at a desired temperature, or perhaps having a garage heater running or a personal computer or television turned on awaiting their arrival. It will be appreciated that these examples are illustrative only, and are not intended to be limiting.

As noted, some building components, equipment and/or systems may require a longer lead time to turn on and reach a desired state. In some cases, the First Building Component 62 may require more advance notice that the building 60 will be occupied. In some instances, the Second Building Component 64 may not require as much advance notice. Accordingly, in some cases, multiple geofences may be used. For example, in FIG. 7, it can be seen that the building 60 may be disposed within a first geofence 66 and a second geofence 68. In some cases, as illustrated, the first geofence 66 is substantially larger than the second geofence 68. In some cases, the first geofence 66 may be used in conjunction with control of the First Building Component 62 while the second geofence 68 may be used in conjunction with control of the Second Building Component 64. It will be appreciated that there may be any number of additional geofences that may be used in conjunction with control of any number of different building components, equipment and/or systems as desired.

In the example shown, the first geofence 66 and the second geofence 68 are each illustrated as being circular. In some cases, the first geofence 66 and/or the second geofence 68 may have other shapes, as appropriate. For example, if the building 60 is located close to a body of water such as a river or large lake, or even an ocean, one side of the first geofence 66 and/or the second geofence 68 may be truncated if it is unreasonable to expect a person carrying the mobile device 14 (FIG. 4) to pass into or over the body of water. In some instances, other natural formations may dictated a non-circular shape for the first geofence 66 and/or the second geofence 68. In some cases, geopolitical considerations such as a national border may dictate a different geofence shape. In some cases, a user may desire a non-circular geofence shape to provide a better user experience. For example, a user may wish to have a geofence extends further from the user's home along the route to the user's work place than in the direction of a local shopping center. This is just one non-limiting example.

In some cases, the size and/or shape of the first geofence 66 and/or the second geofence 68 may change in response to current conditions. Illustrative but non-limiting examples of current conditions that may impact geofence size and/or shape include one or more of a current traffic condition along a route between the user's mobile device and the building, a current speed of the user's mobile device, a current location of the user's mobile device, and/or an estimated time of arrival of the user's mobile device at the building. It will be appreciated that a geofence may change in response to particular current conditions. If the current conditions indicate that it will take longer for an individual to return home, such as if traffic is bad, a geofence may become smaller because the individual will not be able to travel as far in a given period of time. The period of time may correspond to, for example, the recovery time of the device or system in question (e.g. for an HVAC system, the time to heat the building from the energy savings set point to the comfort set point). In some cases, the size and/or shape of the first geofence 66 and/or the second geofence 68 may change in real time or near real time in response to changes in the current conditions. In other cases, the size and/or shape of the first geofence 66 and/or the second geofence 68 may change at a predetermined interval or rate, after one or more current conditions change by at least a threshold amount, and/or at any other suitable time.

Additional illustrative but non-limiting examples of current conditions that may impact geofence size and/or shape, particularly if the geofence is related to HVAC system operation, include one or more of a current indoor temperature in the building, a current outdoor temperature, a current indoor humidity in the building, a current outdoor humidity, a current solar load on the building, and/or a current utility rate.

Figure 7:
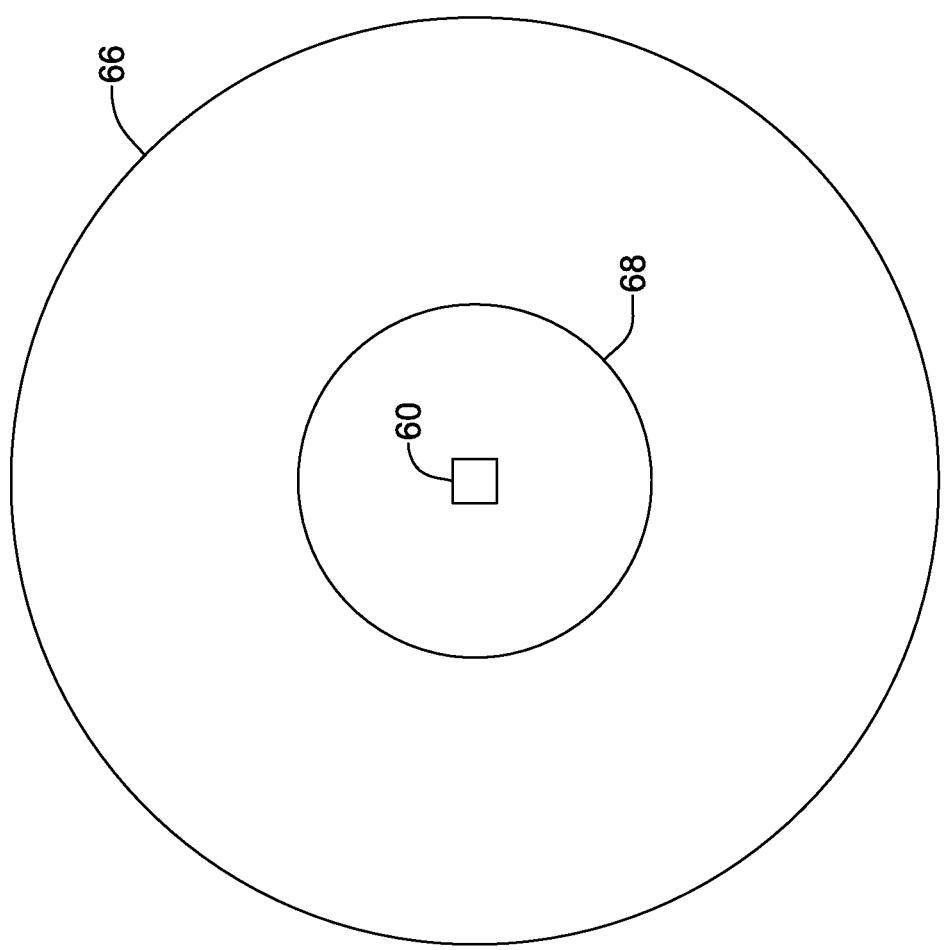
FIGS. 7-10 are schematic illustrations of geofences that may be used in combination with the building of FIG. 6.

It will be appreciated that the shapes and/or dimensions of the first geofence 66 and the second geofence 68, as seen in FIG. 7, may correspond to the shapes and/or dimensions of the first geofence 66 and/or the second geofence 68 as originally configured. In some cases, the shapes and/or dimensions of the first geofence 66 and the second geofence 68, as seen in FIG. 7, may correspond to the shapes and/or dimensions of the first geofence 66 and/or the second geofence 68 as previously altered in response to changing current conditions.

Figure 8:
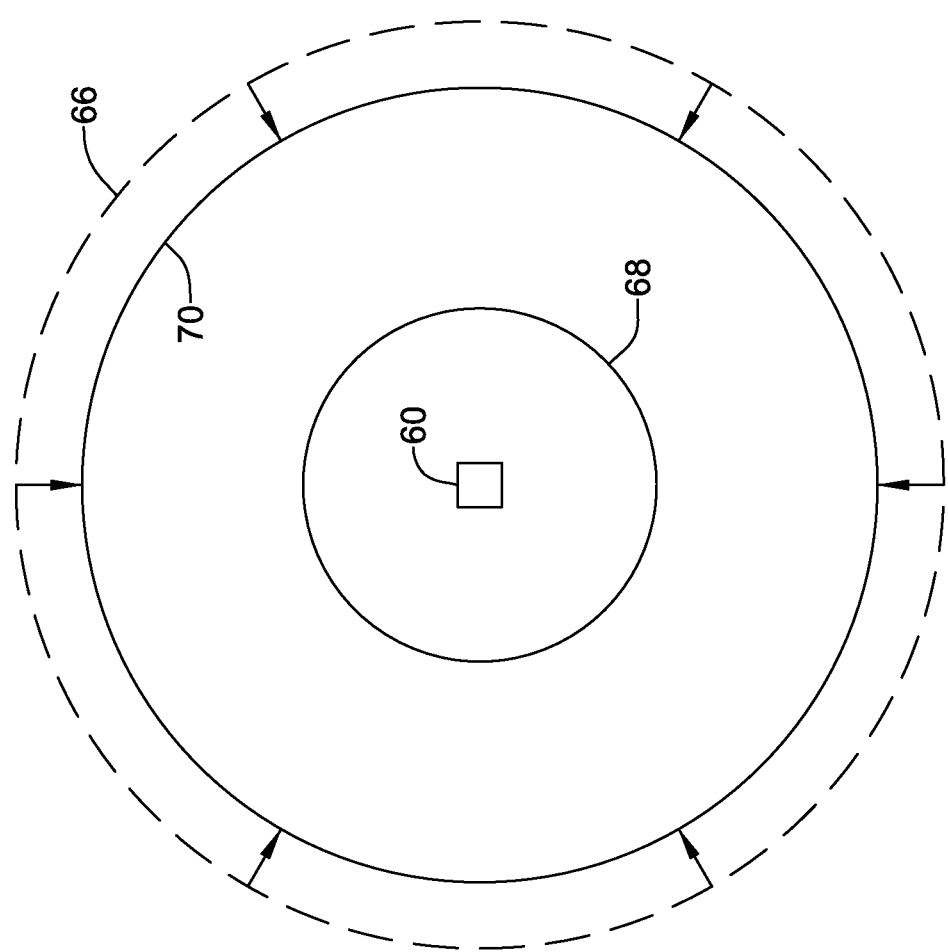

In FIG. 8, it can be seen that the first geofence 66, now shown in dashed line, has moved inward to form a new first geofence 70 that is smaller than the previous first geofence 66. For example, if the weather is particularly mild that day, it won't take as long for an HVAC system in the building 60 to regain a comfort temperature set point. As another example, if traffic is particularly bad, the user won't be able to travel as far within a given time period. These examples are merely illustrative, and are not intended to be limiting. In FIG. 8, the second geofence 68 has not been altered. In some cases, the second geofence 68 may not be altered in response to current conditions if the system whose control is impacted by the second geofence 68 has a short response time. For example, if the second geofence 68 is being used to control operation of a lighting system, the second geofence 68 may have a small diameter that rarely if ever changes with current conditions.

Figure 9:
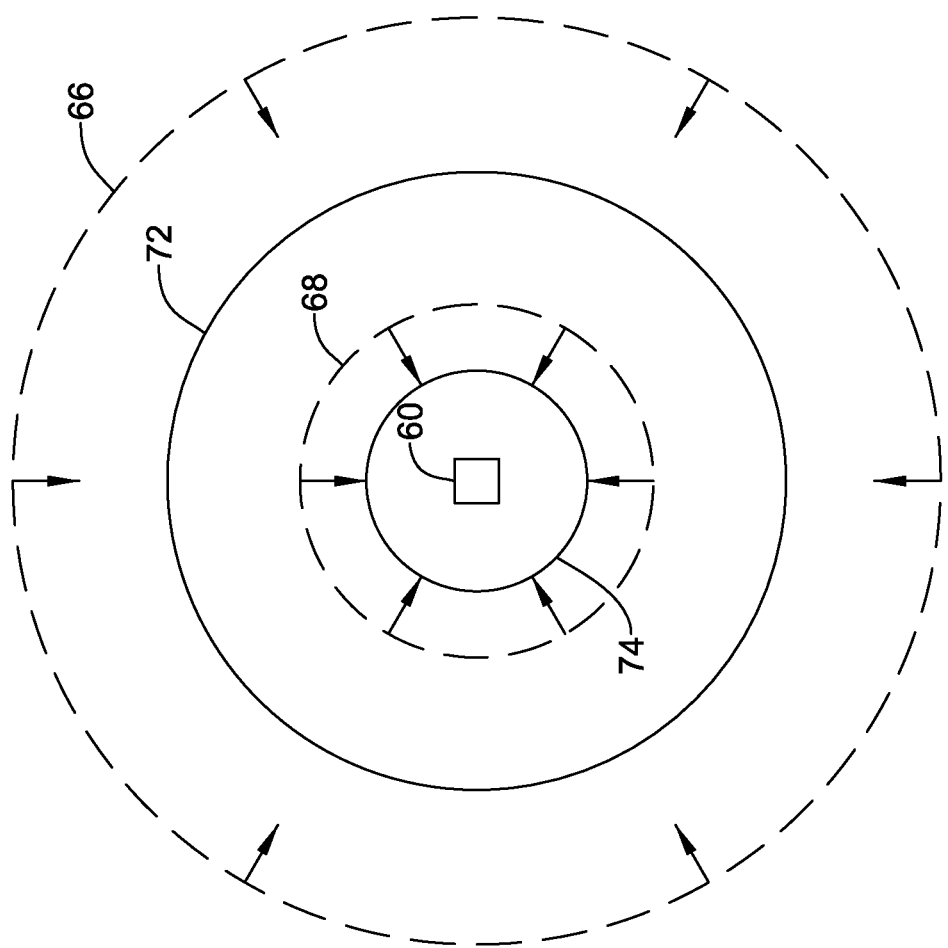

Moving to FIG. 9, it can be seen (relative to FIG. 7) that the first geofence 66, shown in dashed line, has moved inward considerably and has formed a new first geofence 72. The second geofence 68, shown in dashed line, has moved inward a short distance and has formed a new second geofence 74. This may occur, for example, in response to current conditions indicating substantial delays in the individual returning to the building 60. For example, if the building 60 is in a region undergoing a strong storm such as a winter blizzard, the first geofence 72 controlling operation of an HVAC system may be made much smaller as the individual will not be able to travel very far during the expected recovery time of the HVAC system. In another example, if the indoor temperature is at or close to the comfort temperature set point, sometimes due to the outdoor temperature being similar to the comfort temperature set point, the first geofence 72 controlling operation of an HVAC system may be made much smaller as the expected recovery time of the HVAC system will be small.

Figure 10:
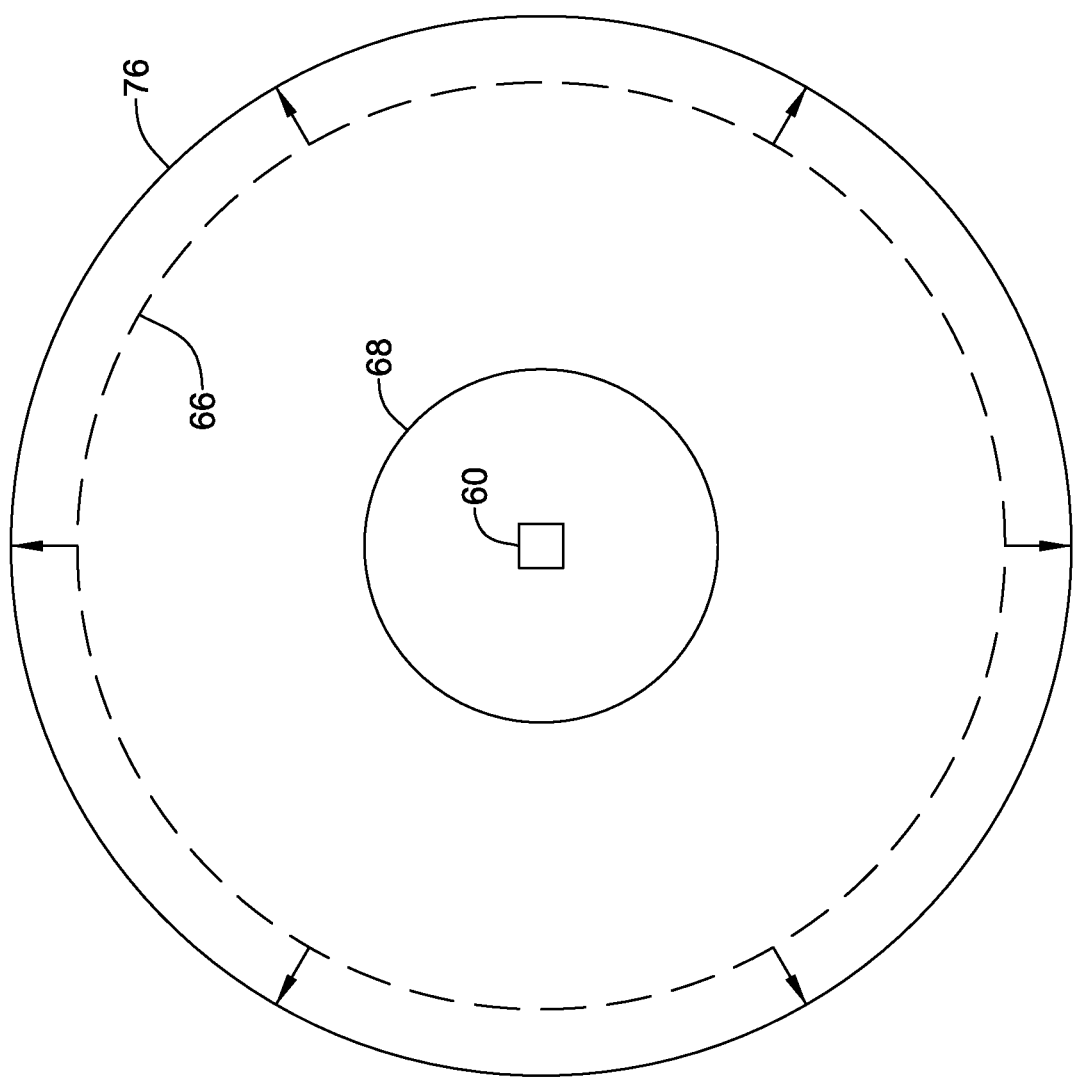

In some cases, a geofence may be made larger in response to current conditions. In FIG. 10, the first geofence 66, shown in dashed line, has moved in an outward direction to form a new first geofence 76. As illustrated, in some cases the second geofence 68 remains unchanged. The new first geofence 76 may be larger than the previous first geofence 66 if, for example, current conditions indicate that traffic is much lighter than expected. As another example, an HVAC system may need more time to recover to a comfort temperature set point if the weather is particularly cold that day (during the heating season), or if high winds cause a high thermal loss in the building 60. It will be appreciated that the geofence examples shown in FIGS. 6-10 are merely illustrative, as any number of different geofences may be utilized, and the adaption of the geofences will often depend on the changing current conditions.

Figure 11:
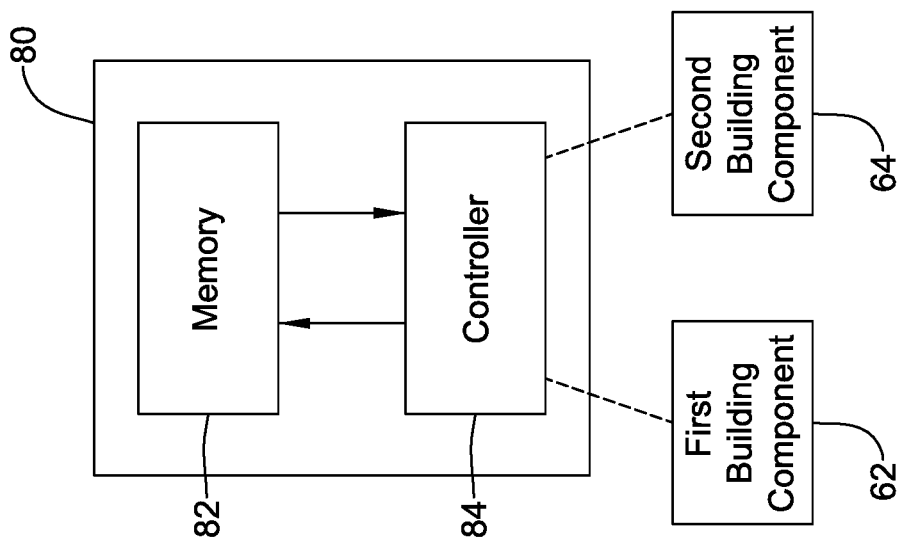
FIG. 11 is a schematic view of an illustrative building automation system.

FIG. 11 is a schematic illustration of a building automation system 80 that may be configured to control two or more building components within the building 60. As illustrated, the building automation system 80 is shown controlling the First Building Component 62 and the Second Building Component 64. This is only illustrative, and it is contemplated that additional equipment, components and/or building systems may be controlled at least in part by the building automation system 80. In some cases, the building automation system 80 includes a memory 82. The memory 82 may, for example, store a first geofence such as the first geofence 66 for the First Building Component 62. In some cases, the memory 82 may store a second geofence such as the second geofence 68 for the Second Building Component 64. A controller 84 may be operably coupled to the memory 82 and may, for example, be configured to cause an adjustment to operation of the First Building Component 62 in response to a user's mobile device crossing the first geofence 66. In some cases, the controller 84 may be configured to cause an adjustment to operation of the Second Building Component 64 in response to the user's mobile device crossing the second geofence 68.

In some cases, the controller 84 may be configured to receive one or more current conditions and to adapt a size and/or shape of the first geofence 66 and/or second geofence 68 based on the received one or more current conditions. In some cases, the size and/or shape of the first geofence 66 may be adapted more than the size and/or shape of the second geofence 68 in response to at least one of the received current conditions. In some cases, the size of the first geofence 66 is adapted and the size of the second geofence 68 is not adapted in response to at least one of the received current conditions.

In some cases, the one or more current conditions include, but are not limited to, one or more of a current indoor temperature in the building 60, a current outdoor temperature, a current indoor humidity in the building 60, a current outdoor humidity, a current solar load on the building 60, a current utility rate, and a current Adaptive Intelligent Recovery (AIR) ramp rate for the HVAC equipment in the building 60. Additional examples include but are not limited to one or more of a current traffic condition along a route between the user's mobile device and the building, a current speed of the user's mobile device, a current location of the user's mobile device, and an estimated time of arrival of the user's mobile device at the building. In some cases, the one or more current condition may, for example, include historical data regarding past behavior of the user and/or past history of geofence boundary changes.

In some cases, the controller 84 may be configured to accept user input that assigns each of two or more building components (such as the First Building Component 62 or the Second Building Component 64) to either the first geofence 66 or the second geofence 68 (or another geofence if desired). In some instances, the controller 84 may also be configured to accept user input that assigns one or more current conditions to each of the first geofence 66 and the second geofence 68. The size and/or shape of each of the first geofence 66 and/or the second geofence 68 may, for example, be adapted by the controller based on the assigned one or more current conditions as described herein.

In some cases, for example, the controller 84 may be configured to reduce the size of the first geofence 66 and/or the size of the second geofence 68 when traffic is slower than what was expected when the size of the first geofence 66 and/or the size of the second geofence 68 was previously adapted. In some instances, the controller 84 may be configured to increase the size of the first geofence 66 and/or the size of the second geofence 68 when traffic is faster than what was expected when the size of the first geofence 66 and/or the size of the second geofence 68 was previously adapted. In some cases, the controller 84 may be configured to adapt the size of the first geofence 66 and/or the size of the second geofence 68 based at least in part on data indicating how quickly one or more of the building components can produce a desired condition in the building 60.

In some cases, the controller 84 may be configured to send a message to the user's mobile device soliciting approval before adapting the size of the first geofence 66 and/or the size of the second geofence 68. The message may be in the form of a pup-up menu, a text message, an email or any other suitable message. In some cases, the message may be audible and/or the user approval may be audible. In some instances, the message may include information on estimated energy savings that are expected to result if the adapted size of the first geofence 66 and/or the adapted size of the second geofence 68 is approved. In some cases, the controller 84 may send a follow up message confirming how much energy was saved in response to adapting the size of the first geofence 66 and/or the second geofence 68.

Figure 12:
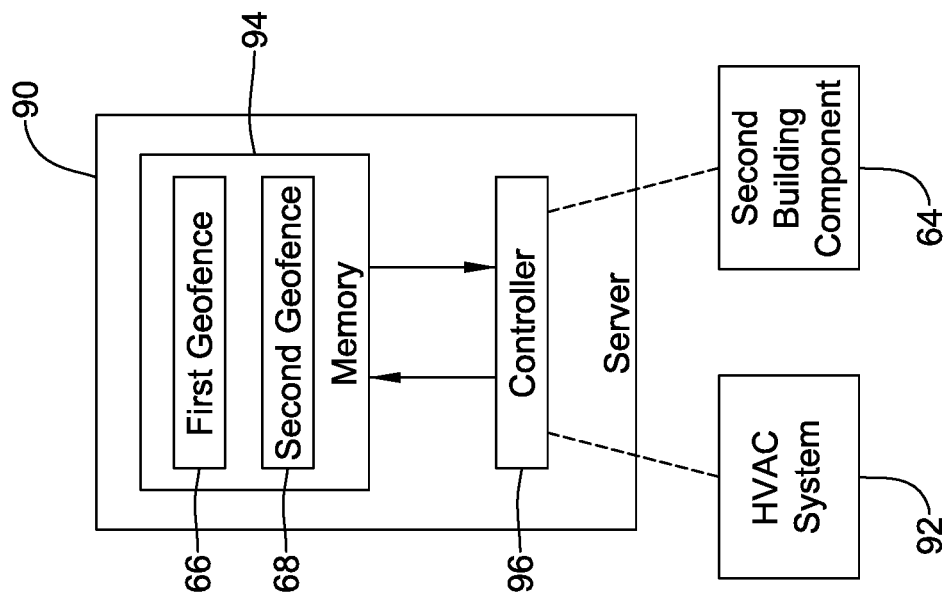
FIG. 12 is a schematic view of an illustrative building automation server.

FIG. 12 is a schematic illustration of a building automation server 90 that may be operably coupled with an HVAC system 92 within the building 60 as well as the Second Building Component 64 within the building 60. The building automation server 90 may include a memory 94 that stores the first geofence 66, which may be used in controlling at least some features of the HVAC system 92. The memory 94 may also store the second geofence 68. In some cases, the second geofence 68 has a size and/or shape that is different from a size and/or shape of the first geofence 66. A controller 96 may be operably coupled to the memory 94. In some cases, the controller 96 may be configured to receive an indication of when the user's mobile device crosses the first geofence 66 and when the user's mobile device crosses the second geofence 68. In some instances, the controller 96 may be configured to cause an adjustment to operation of the HVAC system 92 in response to a user's mobile device crossing the first geofence 66. In some cases, the controller 96 may be configured to transmit one or more instructions to the HVAC system 92 in order to cause the adjustment to operation of the HVAC system 92.

In some cases, the controller 96 may be configured to cause an adjustment to operation of the Second Building Component 64 in response to the user's mobile device crossing the second geofence 68. In some instances, the controller 96 may be configured to receive one or more current conditions and to adapt the size of the first geofence 66 and/or the size of the second geofence 68 based on the received one or more current conditions. In some cases, the controller 96 may be configured to transmit the adapted size and/or shape of the first geofence 66 and/or the adapted size of the second geofence 68 for use by the user's mobile device 14.

FIG. 13 is a flow diagram of an illustrative method that may be carried out by a building automation system that is configured to control two or more building components of a building, such as the building automation system 80. In some cases, a non-transitory computer-readable storage medium may store an executable program that is configured to instruct the building automation system to carry out the method. A first geofence for a first building component of the two or more building components may be stored, as indicated at block 100. A second geofence for a second building component of the two or more building components may also be stored, at seen at block 102. A notification that a user's mobile device has crossed the first geofence may be received and, in response, instruction may be provided for an adjustment to operation of the first building component, as seen at block 104. In some cases, as seen at block 106, a notification that the user's mobile device has crossed the second geofence is received and, in response, instructions for an adjustment to operation of the second building component are provided. As seen at block 108, one or more current conditions may be received. A size of the first geofence and/or a size of the second geofence may be adapted based on the received one or more current conditions, as seen at block 110. In some cases, as seen in optional block 112, the adapted size of the first geofence and/or the adapted size of the second geofence may be transmitted for use by the user's mobile device.

In some cases, each geofence boundary may be associated with a dead band value. For example, the dead band value may be 200 meters (or any other suitable distance) on either side of the geofence. When so provided, geofence entry/exit may be triggered only when user's mobile device crosses the geofence boundary dead band limits, and not just the actual geofence. For example, when exiting, a geofence exit event may not be triggered until the user has traveled 200 meters outside the actual geofence. Likewise, when entering, a geofence enter event may not be triggered until the user has traveled 200 meters inside the actual geofence. This may provide some level of hysteresis, which can help reduce false geofence triggering when a user's mobile device is near the geofence boundary.

In some cases, an energy saving report may be delivered to the user's mobile device that shows estimated energy savings associated with each of the different geofences (e.g. each of the first and second geofences) and/or the cumulative energy savings associated with all of the different geofences.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A building automation system for servicing a building and controlling two or more building components within the building, the building automation system comprising:
   a memory for storing a first geofence for a first building component of the two or more building components, the first building component comprising an HVAC component for conditioning air in the building;
   the memory storing a second geofence for a second building component of the two or more building components, wherein the first geofence comprises a first size different from a second size of the second geofence and/or a first shape different from a second shape of the second geofence, and wherein the second building component is a non-HVAC component that is not for conditioning air in the building;
   a controller operably coupled to the memory, the controller configured to determine the first size of the first geofence based on one or more previous conditions, determine the second size of the second geofence based on the one or more previous conditions, and cause an adjustment to operation of the first building component in response to a user's mobile device crossing the first geofence;
   the controller further configured to cause an adjustment to operation of the second building component in response to the user's mobile device crossing the second geofence;
   the controller further configured to receive one or more current conditions, wherein the one or more current conditions comprise one or more of a current traffic condition along a route between the user's mobile device and the building, a current speed of the user's mobile device, a current location of the user's mobile device, or an estimated time of arrival of the user's mobile device at the building; and
   the controller further configured to, in response to determining at least one current condition of the one or more current conditions changes from the one or more previous conditions by at least a threshold amount:
   adapt the first size of the first geofence based on the one or more current conditions and based on a recovery time of the HVAC component; and
   adapt the second size of the second geofence based on the one or more current conditions and based on a recovery time of the non-HVAC component, wherein the recovery time of the non-HVAC component is different than the recovery time of the HVAC component, wherein the first size of the first geofence is adapted more than the second size of the second geofence in response to at least one of the one or more current conditions.

2. The building automation system of claim 1, wherein the controller is configured to accept user input that assigns each of two or more building components to either the first geofence or the second geofence.

3. The building automation system of claim 2, wherein the controller is configured to accept user input that assigns the one or more current conditions to each of the first geofence and the second geofence, wherein the first size of the first geofence and the second size the second geofence are adapted by the controller based on the assigned one or more current conditions.

4. The building automation system of claim 1, wherein the one or more current conditions further comprise one or more of a current indoor temperature in the building, a current outdoor temperature, a current indoor humidity in the building, a current outdoor humidity, a current solar load on the building, or a current utility rate.

5. The building automation system of claim 1, wherein:
the controller is configured to reduce the first size of the first geofence and/or the second size of the second geofence when traffic is slower than what was expected when the first size of the first geofence and/or the second size of the second geofence was previously adapted; and
the controller is configured to increase the first size of the first geofence and/or the second size of the second geofence when traffic is faster than what was expected when the first size of the first geofence and/or the second size of the second geofence was previously adapted.

6. The building automation system of claim 1, wherein the one or more current conditions further comprise historical data regarding past behavior of the user of the user's mobile device.

7. The building automation system of claim 1,
wherein the recovery time of the HVAC component comprises information indicating how quickly the HVAC component can produce a first desired condition in the building; and
wherein the recovery time of the non-HVAC component comprises information indicating how quickly the non-HVAC component can produced a second desired condition in the building.

8. The building automation system of claim 1, wherein the one or more current conditions comprises a current Adaptive Intelligent Recovery (AIR) ramp rate for the HVAC component.

9. The building automation system of claim 1, wherein the second building component that is a non-HVAC component that is not for conditioning air in the building comprises one or more of a security system, a lighting system, a cooking appliance, a washing machine, a dryer, a garage door, a pool heater, a motorized window blind, a water heater, a television, and a personal computer.

10. The building automation system of claim 1, wherein the controller is configured to send a message to the user's mobile device soliciting approval before adapting the first size of the first geofence and/or the second size of the second geofence.

11. The building automation system of claim 10, wherein the message includes information on estimated energy savings that are expected to result if the first adapted size of the first geofence and/or the second adapted size of the second geofence is approved.

12. A building automation server operably coupled with an HVAC system within a building and a second building component within the building, the building automation server comprising:
a memory for storing a first geofence for the HVAC system, the memory also storing a second geofence for the second building component, wherein the second building component comprises a non-HVAC component and wherein a first size of the first geofence is different from a second size of the second geofence;
a controller operably coupled to the memory, the controller configured to determine the first size of the first geofence based on one or more previous conditions, determine the second size of the second geofence based on the one or more previous conditions, and cause an adjustment to operation of the HVAC system in response to a user's mobile device crossing the first geofence;
the controller further configured to cause an adjustment to operation of the second building component in response to the user's mobile device crossing the second geofence;
the controller further configured to receive one or more current conditions, wherein the one or more current conditions comprise one or more of a current traffic condition along a route between the user's mobile device and the building, a current speed of the user's mobile device, a current location of the user's mobile device, or an estimated time of arrival of the user's mobile device at the building; and
the controller further configured to, in response to determining at least one current condition of the one or more current conditions changes from the one or more previous conditions by at least a threshold amount:
adapt the first size of the first geofence based on the one or more current conditions and based on a recovery time of the HVAC component to generate a first adapted size of the first geofence; and
adapt the second size of the second geofence based on the one or more current conditions and based on a recovery time of the non-HVAC component to generate a second adapted size of the second geofence, wherein the recovery time of the non-HVAC component is different than the recovery time of the HVAC component.

13. The building automation server of claim 12, wherein the controller is configured to transmit the first adapted size of the first geofence and/or the second adapted size of the second geofence for use by the user's mobile device.

14. The building automation server of claim 12, wherein the controller is configured to receive an indication of when the user's mobile device crosses the first geofence and when the user's mobile device crosses the second geofence.

15. The building automation server of claim 12, wherein the controller is configured to transmit one or more instructions to the HVAC system in order to cause the adjustment to operation of the HVAC system.

16. A non-transitory computer-readable storage medium with an executable program stored thereon, wherein the executable program is configured to instruct a building automation system configured to control two or more building components of a building to perform the following:

determine a first size of a first geofence for a first building component of the two or more building components based on one or more previous conditions;

store the first geofence for the first building component of the two or more building components;

determine a second size of a second geofence for a second building component of the two or more building components based on the one or more previous conditions;

store the second geofence for the second building component of the two or more building components;

at least one of the first building component and the second building component being free from controlling air temperature in the building;

receive a notification that a user's mobile device has crossed the first geofence, and in response, providing instructions for an adjustment to operation of the first building component;

receive a notification that the user's mobile device has crossed the second geofence, and in response, providing instructions for an adjustment to operation of the second building component;

receive one or more current conditions, wherein the one or more current conditions comprise one or more of a current traffic condition along a route between the user's mobile device and the building, a current speed of the user's mobile device, a current location of the user's mobile device, or an estimated time of arrival of the user's mobile device at the building; and in response to determining at least one current condition of the one or more current conditions changes from the one or more previous conditions by at least a threshold amount:

adapt the first size of the first geofence based on the one or more current conditions and based on a recovery time of the first component; and adapt the second size of the second geofence based on the one or more current conditions and based on a recovery time of the second component, wherein the recovery time of the second component is different than the recovery time of the first component.

* * * * *